No. 785,475. Patented March 21, 1905.

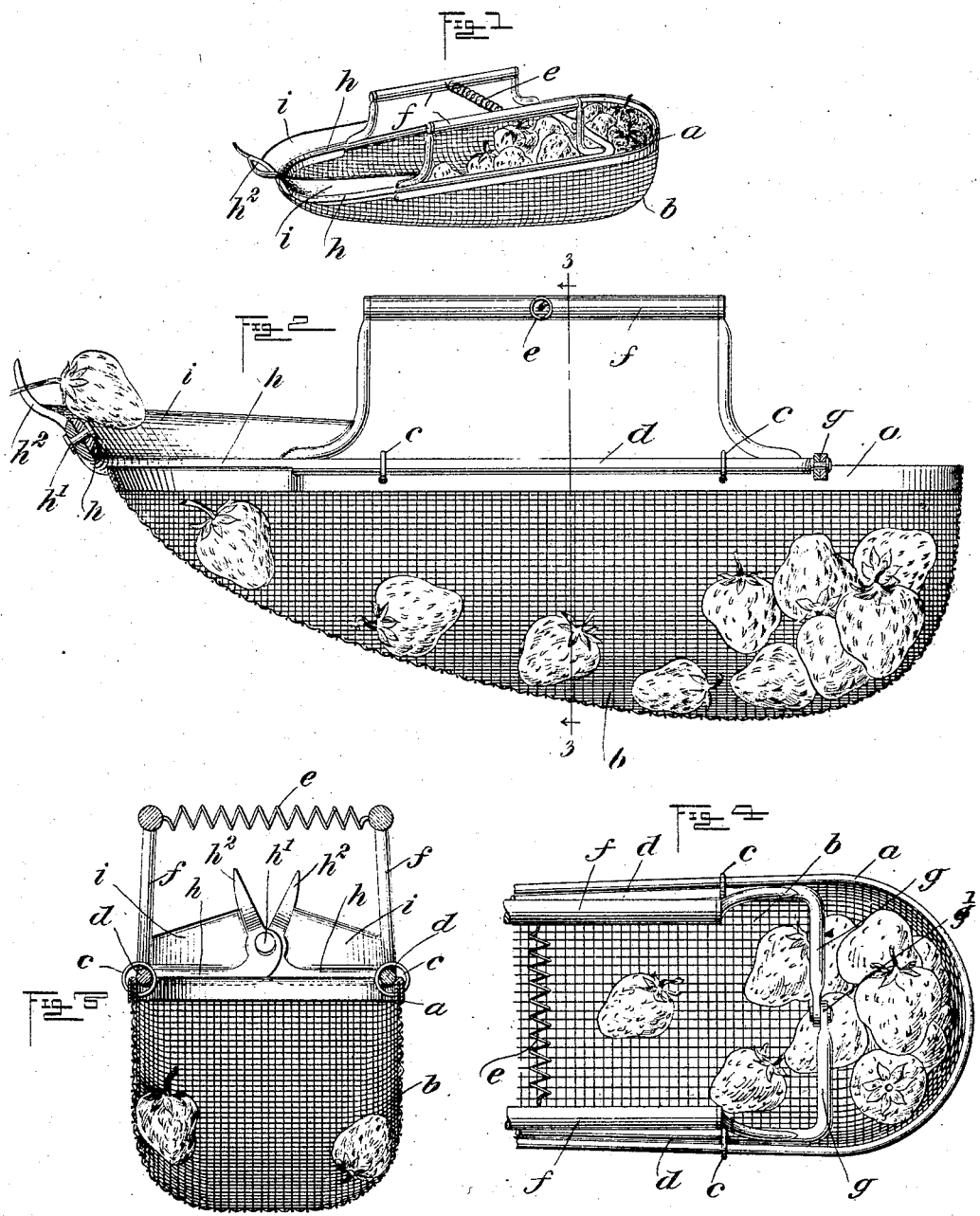

UNITED STATES PATENT OFFICE.

ISAAC CARMAN, OF ST. REMY, NEW YORK.

FRUIT-PICKER.

SPECIFICATION forming part of Letters Patent No. 785,475, dated March 21, 1905.

Application filed December 11, 1902. Renewed December 24, 1904. Serial No. 238,223.

*To all whom it may concern:*

Be it known that I, ISAAC CARMAN, a citizen of the United States, and a resident of St. Remy, in the county of Ulster and State of New York, have invented a new and Improved Fruit-Picker, of which the following is a full, clear, and exact description.

This invention relates to a device intended especially for picking strawberries, and by its means a person may go through a field or garden and conveniently cut the stems of the berries, which will thereupon fall into a receptacle provided for them, this receptacle forming part of the fruit-picker, and when the receptacle is full the berries may be dumped into a box for shipment.

This specification is a specific description of one form of my invention, while the claims define the actual scope thereof.

Reference is to be had to the accompanying drawings, forming a part of this specification, in which similar characters of reference indicate corresponding parts in all the views.

Figure 1 is a perspective view of the invention. Fig. 2 is an enlarged longitudinal section thereof. Fig. 3 is a cross-section on the line 3 3 of Fig. 2, and Fig. 4 is an enlarged plan view of the rear portion of the picker.

The device comprises an elongated and essentially oval frame $a$, to which is fastened a basket $b$, preferably of woven wire. This basket is reduced in depth at its front end—for instance, the left-hand end in Fig. 2—the basket sloping from a point at said end downward to a deep rear portion located at the other end of the device. The berries are picked at the forward end, but they roll down the inclined or sloping bottom of the basket, so as lie snugly in the deep main portion thereof.

Connected to the frame $a$ by means of rings $c$ are rocker-bars $d$, which are located one at each side of the basket and have handles $f$ attached thereto. $e$ indicates a spring, which may be of any sort desired, this spring bearing between the handles $f$ and serving to hold them normally spread apart, as in Fig. 1. Said rocker-bars $d$ are connected at their rear portions with inwardly-disposed lateral extensions $g$, and these extensions $g$ are pivoted to each other, as indicated at $g'$. By this means the rocker-bars are connected together, and upon the movement of the handles $f$ toward each other the extensions $g$ are thrown slightly downward into the basket. This movement is not, however, sufficiently great to interfere with the fruit.

At their front ends the bars $d$ are formed with forwardly and inwardly curved extensions $h$, pivoted together, as indicated at $h'$, and terminating in shear-blades $h^2$, which lie at the front of the fruit-picker and are inclined upward and outward, as shown. As the handles $f$ are moved together the shear-blades are operated and cross each other, and thus the stem of the berry is cut. Fig. 2 illustrates the parts during the act of cutting off the stem of a berry.

$i$ indicates guards which are fastened to the extensions $h$ and extend from the front portions of the handles $f$ to the shear-blades $h^2$, these guards serving to prevent the berries from rolling sidewise out of the basket after they are cut. The guards are fastened securely to or formed integrally with the extensions $h$ of the rocker-bars $d$ and virtually form parts of said extensions.

The manner of using the invention will be apparent from the foregoing description. In practical operation it is my purpose to make the rings $c$ removable, so that the fruit-pickers may be made in quantities and packed for shipment by nesting the baskets together and placing the parts $d$, $f$, $h$, and $i$ alongside of the basket. Then by merely applying the rings $c$ the parts of the basket may be assembled, and the device is ready for use. This enables a great number of the devices to be packed securely in a relatively small space, and at the same time the disassociated parts may be assembled for use with very little labor and without the exercise of any mechanical skill.

The flexibility of the basket and the loose connection effected by the rings $c$ allows fully for all unevenness of movement due to the disposition of the pivots $h'$ with respect to the bars $d$.

This invention enables the berries to be picked more rapidly than by hand, and it enables the berries to be placed on the market without having been touched by one's fingers, and therefore the berries are not mashed or bruised and retain their natural bloom. Further, the shears $h^2$ cut the stalk of the berry and leave the same with the cap on the fruit, notwithstanding that the stem is left on the berry, and the berry is picked without being torn or bruised in any way, and at the same time the vines are in no way injured, as is now common from hand-picking.

After the berries are picked and placed in the baskets $b$ any sand which may be on the berries is gradually sifted through the baskets, and the berries are thus delivered from the baskets in a clean condition.

Various other advantages of my invention will be apparent to persons skilled in the art of horticulture.

Various changes in the form, proportions, and minor details of the invention may be resorted to at will without departing from the essential principles thereof, and hence I consider myself entitled to all variations of the structure shown as may lie within the terms of my claims.

Having thus described my invention, I claim as new and desire to secure by Letters Patent—

1. A fruit-picking device comprising a basket, rocker-bars mounted at the sides thereof, handles for operating said bars, and shear-blades attached to the bars and located at the front portion of the basket, substantially as described.

2. A fruit-picker comprising a basket, shear-blades mounted at the front portion thereof, means for operating said blades, and guard-plates extending from the blades rearwardly, at each side of the basket, substantially as described.

3. In a fruit-picker comprising a basket, rocker-bars mounted at each side thereof, said bars having forwardly and inwardly disposed extensions, shear-blades fastened to said extensions and lying at the front of the basket, and means for operating the rocker-bars, substantially as described.

4. In a fruit-picker comprising a basket, rocker-bars mounted at each side thereof, said bars having forwardly and inwardly disposed extensions, shear-blades fastened to said extensions and lying at the front of the basket, means for operating the rocker-bars, and guards attached to the shear-blades and extending rearwardly at each side of the basket, substantially as described.

5. A fruit-picker comprising a basket, rocker-bars mounted at each side thereof, said bars having rearward inwardly-disposed extensions pivoted together and forwardly and inwardly direction extensions also pivoted together, handles attached to the rocker-bars, shear-blades mounted on said forward extensions of the rocker-bars, and guard-plates extending from the shear-blades rearward at each side of the basket, substantially as described.

6. A fruit-picker comprising a basket, rocker-bars, rings mounting said bars at each side of the basket, shear-blades supported from the rocker-bars, and means for operating said bars, substantially as described.

7. A fruit-picker, comprising a basket, handles attached to the basket and projecting upward therefrom, said handles being relatively movable, and shear-blades located at the front end of the basket and having connection with the handles, to be operated therefrom.

8. A strawberry-picker, comprising a basket, a handle member movably mounted thereon and projected upward therefrom to permit carrying the basket, and means for cutting the strawberry-stem, said means being located at the front end of the basket and connected with the said handle, to be operated therefrom.

In testimony whereof I have signed my name to this specification in the presence of two subscribing witnesses.

ISAAC CARMAN.

Witnesses:
E. L. ANGLE,
HENRY R. DEWITT.